United States Patent
Kadowaki et al.

(10) Patent No.: US 7,141,223 B2
(45) Date of Patent: Nov. 28, 2006

(54) FUEL REFORMER

(75) Inventors: Masataka Kadowaki, Osaka (JP); Akira Fuju, Osaka (JP)

(73) Assignee: Sanyo Electric Co., Ltd., Osaka (JP)

( * ) Notice: Subject to any disclaimer, the term of this patent is extended or adjusted under 35 U.S.C. 154(b) by 707 days.

(21) Appl. No.: 10/070,123

(22) PCT Filed: Jul. 3, 2001

(86) PCT No.: PCT/JP01/05771

§ 371 (c)(1),
(2), (4) Date: Mar. 29, 2002

(87) PCT Pub. No.: WO02/02459

PCT Pub. Date: Jan. 10, 2002

(65) Prior Publication Data

US 2003/0044334 A1    Mar. 6, 2003

(30) Foreign Application Priority Data

Jul. 4, 2000   (JP)  .............................. 2000-202305

(51) Int. Cl.
*B01J 19/00*   (2006.01)

(52) U.S. Cl. ...................... 422/240; 422/211; 422/201; 422/202; 422/312; 422/310; 422/241; 48/61; 48/76; 75/126; 75/128; 208/48; 585/636

(58) Field of Classification Search ................. 420/50, 420/51, 584; 422/241, 310; 148/277, 285; 428/681–686

See application file for complete search history.

(56) References Cited

U.S. PATENT DOCUMENTS 4,444,732 A * 4/1984 Konoki et al. .............. 422/310
5,316,721 A * 5/1994 Sugitani et al. ................ 420/50
6,458,318 B1 * 10/2002 Nishiyama et al. ......... 420/448

FOREIGN PATENT DOCUMENTS

| JP | 61-40396 A | 2/1986 |
| JP | 1-152246 A | 6/1989 |
| JP | 4-83840 A | 3/1992 |

* cited by examiner

*Primary Examiner*—Glenn Caldarola
*Assistant Examiner*—Vinit H. Patel
(74) *Attorney, Agent, or Firm*—Weingarten, Schurgin, Gagnebin & Lebovici LLP (57) ABSTRACT

A fuel reformer for reforming hydrocarbon base fuel into hydrogen rich gas, with one embodiment comprised of material containing at least 15 to 25% by mass Cr, 8 to 35% by mass Ni, 2 to 4% by mass Si and the remainder Fe and inevitable impurities (C, Mn, P, S or others). The material provides sigma brittleness resistance and cementation resistance, and provides a reformer that is lightweight, low-cost, highly reliable and durable. A second embodiment adds to the composition 0.05 to 1% by mass Nb, providing improved oxidation resistance, cementation resistance, intergranular corrosion resistance, with further improved reliability and durability.

4 Claims, 5 Drawing Sheets

FUEL REFORMER

FIELD OF THE INVENTION

The present invention concerns a fuel reformer for reforming a hydrocarbon base fuel into a hydrogen rich gas.

BACKGROUND ART

In the case of reforming a hydrocarbon base fuel, for example methane, into a hydrogen rich gas (endothermic reaction) through water vapor reforming, the operating temperature of the reformer is approximately 700° C. (outlet temperature of reforming catalyst layer); however, the surface temperature of the material composing the reformed is supposed to be equal or superior to about 1000° C. in the vicinity of the heating portion of the reformer. In addition, a hydrocarbon base fuel mixed with steam is introduced in the fuel reformer, and reformed into a gas containing hydrogen about 75%, carbon monoxide on the order of about 10 and several % and carbon dioxide on the order of about 10 and several %. Consequently, as for materials composing the fuel reformer, a material that can resist to such a high temperature and an environment containing steam, hydrogen, carbon monoxide, carbon dioxide, or others is required.

In the case of steel material containing Cr, generally, a steel material to be used under a high temperature is required to resist to the oxidation. In general, a dense oxide of Cr is formed on the surface, acts as protection film, and protects the base material. Moreover, the addition of Ni together with Cr increases the heat resistance and stabilizes also the structure. For instance, the stainless base material is an alloyed steel containing Cr and Ni for the purpose of improving the corrosion resistance, and is a steel containing Cr by about 11 mass % or more.

The stainless base material used for heat resistance has been improved by JIS on the basis of SUS302 of SUS 300s, and ordinarily, Cr concentration of stainless base material used for heat resistance is 15 mass % or more, and contained on the order of 25 mass % in SUS310S. The oxidation resistance is improved with the increase of Cr concentration; however, an abnormal setting occurs around 700 to 800° C. (950 to 1100 K), provoking degradation at the same time [a degradation phenomenon occurring together with the deposition of intermetallic compound σphase comprising mainly FeCr at 830° C. (1100K) or less is called sigma brittleness and tends to occur easily with the increase of Cr quantity].

On the other hand, in a high temperature atmosphere containing hydrocarbon base gas, carbon monoxide or carbon dioxide, C contained in the atmosphere penetrates into the steel (into the base metal), provoking cementation. As the cementation progresses, carbon binds with Cr in the steel, forms Cr carbide at the grain boundary, Cr concentration in the base material lowers, making difficult to form a dense Cr oxide on the surface and reducing the oxidation resistance and, at the same time, intergranular corrosive cracking might be provoked by the Cr carbide deposited on the grain boundary.

Therefore, in order to make the sigma brittleness resistance and the cementation resistance compatible, it is necessary to maintain the oxidation resistance all the way controlling the Cr concentration and, to limit the cementation. As mentioned above, inside the reformer, the compatibility of sigma brittleness resistance and cementation resistance is required.

The fuel reformer is used, for instance, to supply a fuel cell with hydrogen rich gas.

The fuel cell system of the related art has a scale of several tens KW or more, increasing the size of reformer for the reactor is used a thick material in order to make the sigma brittleness resistance and the cementation resistance compatible, provoking problems of heavy weight and high material cost.

Even a small reformer, conventionally, has been using a heat resistant alloy (SUS310S or the like) or super alloy (Incoloy800 or the like) of Cr:20 mass % or more and Ni:18 mass % or more; however, heat resistant alloy, especially super alloy such as Incoloy800 or the like of Cr:20 mass % or more and Ni:18 mass % or more is extremely expensive. Moreover, even in a reformer using a reaction tube material of super alloy, cementation phenomenon was observed in the vicinity of the catalyst layer after the reforming test (after 100 cycles, 800 hours), confirming its insufficiency.

On the other hand, a fuel reformer material containing C 0.1 wt % or less, Cr 17 to 23 wt %, Ni 8 to 29 wt %, Nb 0.1 to 0.4 wt %, containing one or two elements chosen from Ti, Zr by 0.05 to 0.3 wt %, and further containing N 0.02 to 0.05 wt %, B 0.003 to 0.01 wt % and composed of remaining Fe and inevitable impurities (Japan Patent Publication Laid-Open HEI 5-339679) is proposed.

Though this reformer material is excellent in creep rupture strength and oxidation resistance and generates quite scarcely a harmful σ phase, but does not consider the cementation, decreases Cr content in the base material as the cementation progresses as mentioned above, making difficult to form a dense Cr oxide on the surface and increasing the possibility of causing intergranular corrosion.

The object of the present invention is to provide a light, low cost and cheap, highly reliable and long life fuel reformer, that resolves conventional problems, and provides the sigma brittleness resistance and the cementation resistance, without increasing the wall thickness of the reformer in order to make the sigma brittleness resistance and the cementation resistance compatible.

DISCLOSURE OF THE INVENTION

In order to solve the aforementioned problems, the fuel reformer of claim 1 is a fuel reformer for reforming a hydrocarbon base fuel into a hydrogen rich gas, wherein at least a part of material composing the reformer is a material containing at least Cr, Ni, Si, Cr 15 to 25 mass %, Ni 8 to 35 mass %, Si 2 to 4 mass % and the remaining ingredients include Fe and inevitable impurities (C, Mn, P, S or others).

The fuel reformer of the present invention, using an improved stainless material containing Si, provides the sigma brittleness resistance and the cementation resistance at the same time, and also a light weight, low cost and cheap price, high reliability, and long life.

The fuel reformer of claim 2 is a fuel reformer for reforming a hydrocarbon base fuel into a hydrogen rich gas, wherein at least a part of material composing the reformer is a material containing at least Cr, Ni, Si, Nb, Cr 15 to 25 mass %, Ni 8 to 35 mass %, Si 2 to 4 mass %, Nb 0.05 to 1 mass % and the remaining ingredients include Fe and inevitable impurities (C, Mn, P, S or others).

The fuel reformer of the present invention, using an improved stainless material containing furthermore a predetermined quantity of Nb together with Si, provides improved oxidation resistance, cementation resistance and intergranular corrosion resistance, and also increased reliability, and durable years.

The fuel reformer of claim 3 is the fuel reformer of claim 2, wherein at least a part of material composing the reformer is a material containing at least Cr, Ni, Si, Nb, Cr 17 to 20 mass %, Ni 8 to 14 mass %, Si 2 to 4 mass %, Nb 0.05 to 0.5 mass % and the remaining ingredients include Fe and inevitable impurities (C, Mn, P, S or others).

The fuel reformer of claim 4 is the fuel reformer of one of claims 1 to 3, wherein a portion where raw fuel introduced from a raw fuel inlet of the reformer and steam come into contact with is composed of the material.

The fuel reformer of claim 5 is the fuel reformer of claim 4, wherein a portion where raw fuel introduced from a raw fuel inlet of the reformer and steam come into contact with and which is a heated portion is composed of the material.

Now the present invention shall be described more in detail by embodiments and comparative examples, but the present invention is not limed by these embodiments at all.

Now, embodiments of the present invention shall be described in detail referring to drawings.

FIG. 1 to FIG. 5 are sections illustrating the fuel reformer of the present invention.

Figure 1:
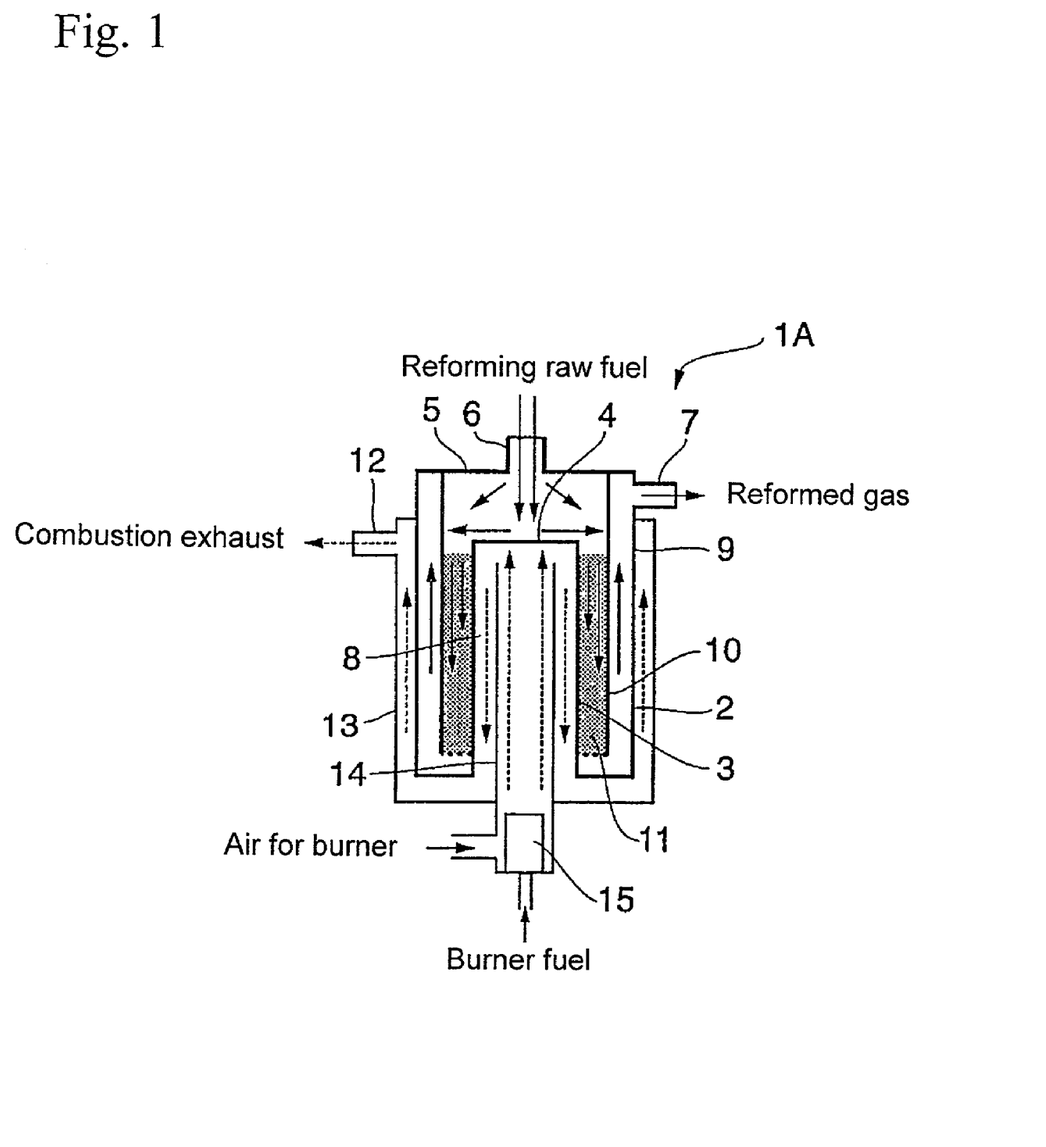
FIG. 1 is a cross-sectional illustrative drawing of an embodiment of the fuel reformer of the present invention.

In FIG. 1, the fuel reformer 1A of the present invention contains a reforming tube 9 provided with a reforming tube outer cylinder 2, a reforming tube inner cylinder 3, a reforming tube inner cylinder upper plate 4, a reforming tube outer cylinder upper plate 5, a raw fuel inlet 6 disposed on this reforming tube outer cylinder upper plate 5, a reformed gas outlet 7 or others, a catalyst tube 10 fitted to the inside of the reforming tube 9, a reforming catalyst 11 (for instance, Ni, ruthenium catalyst supported by aluminum, or the like) filled between the reforming tube inner cylinder 3 and the catalyst tube 10, a combustion gas passage 8 for introducing combustion gas for heating into a hollow section provided at the middle of the reforming tube 9, a combustion gas pipe 14 inserted into the aforementioned hollow section in order to introduce combustion gas into the combustion gas passage 8, a burner 15 installed in the lower part of the combustion gas pipe 14, a combustion exhaust pipe 13 for directing the combustion gas having passed through the combustion gas passage 8 bringing into contact with the outside of the reforming tube 9, a combustion exhaust outlet 12 for discharging combustion gas outside, and others.

In FIG. 1, gas fuel is burned by introducing gas fuel and air into the burner 15, combustion gas is directed to the combustion gas passage 8 through the combustion gas pipe 14 as shown by the broken line arrow for heating the reforming catalyst 11, then, combustion exhaust is discharged from the combustion exhaust outlet 12 passing through the combustion exhaust pipe 13.

On the other hand, a hydrocarbon base fuel, for instance, methane is introduced with water vapor from the raw material inlet 6 into the fuel reformer 1A as shown by the arrow, made into contact with the heated reforming catalyst 11, and reformed. The operating temperature of the fuel reformer 1A is controlled to about 700° C. (outlet temperature of the reforming catalyst 11) and operated. The produced reformed gas (if a raw material of steam/carbon (mol ratio)=on the order of 2.5, a reforming gas containing hydrogen by about 75%, carbon monoxide by about 10%, carbon dioxide on the order of about 10%, and methane gas for the remainder) is discharged from the reformed gas outlet 7 passing between the reforming tube outer cylinder 2 and the catalyst tube 10 as shown by the arrow.

In FIG. 1, points indicated by a thin line such as combustion gas pipe 14, combustion exhaust pipe 13 or others composing the fuel reformer 1A are made of an ordinary steel, and points indicated by a bold line in FIG. 1 (reforming tube outer cylinder 2, reforming gas outlet 7, catalyst tube 10, reforming tube inner cylinder 3, reforming tube inner cylinder upper plate 4, reforming tube outer cylinder upper plate 5, raw fuel inlet 6 and others composing the reforming tube 9) are made of the material according to the present invention comprising Cr 15 to 25 mass %, Ni 8 to 35 mass %, Si 2 to 4 mass % and the remaining ingredients including Fe and inevitable impurities (C, Mn, P, S or others), or, are made of a material containing Cr 15 to 25 mass %, Ni 8 to 35 mass %, Si 2 to 4 mass %, Nb 0.05 to 1 mass % and the remaining ingredients including Fe and inevitable impurities (C, Mn, P, S or others), or, are made of a material containing Cr 17 to 20 mass %, Ni 8 to 14 mass %, Si 2 to 4 mass %, Nb 0.05 to 0.5 mass % and the remaining ingredients include Fe and inevitable impurities (C, Mn, P, S or others).

The corrosion resistance is improved as Cr content increases, and it is feared that the corrosion resistance becomes insufficient if Cr is less than 15 mass %.

If Cr content is excessive, it is feared that σ (sigma) phase comprising mainly FeCr deposits at a temperature on the order of 700° C. to 830° C. and the sigma brittleness generates. Therefore, it is preferable that Cr content be lower within a range not damaging the corrosion resistance and it is desirable to make it 25 mass % or less, and more preferably, 20 mass % or less.

Further, in the case of Fe-18 Cr alloyed steel containing Cr by 18 mass %, the addition of Ni makes it an austenite base stainless steel at 8 mass % or more, increasing the corrosion resistance and workability. If Ni is less than 8 mass %, it is feared that the workability and corrosion resistance are not improved sufficiently, it is preferable to make Ni content equal or superior to 8 mass %.

Certainly, the heat resistance and the oxidation resistance are improved by a higher Ni content, but if it exceeds 35 mass %, the workability lowers increasing the price; therefore, the Ni content is preferably equal or inferior to 35 mass %, and more preferably, it is desirable to make it equal or inferior to 14 mass %.

Si improves iron high temperature oxidation and cementation resistance. However, an excessive addition damages plasticity and workability; therefore SI content is 2 to 4 mass %. Less than 2 mass %, it is feared that high temperature oxidation and cementation resistance are not improved, and exceeding 4 mass %, it is feared that plasticity and workability be damaged.

The addition of Nb, fixing C in the form of NbC, improves the cementation resistance, and limits the intergranular corrosion. Nb content may be low, and is 0.05 to 1 mass %, normally on the order of 0.1 to 0.5 mass %. Less than 0.05 mass %, it is feared that the cementation resistance is not improved, and exceeding 1 mass %, it is feared that the structure be unbalanced.

Figure 2:
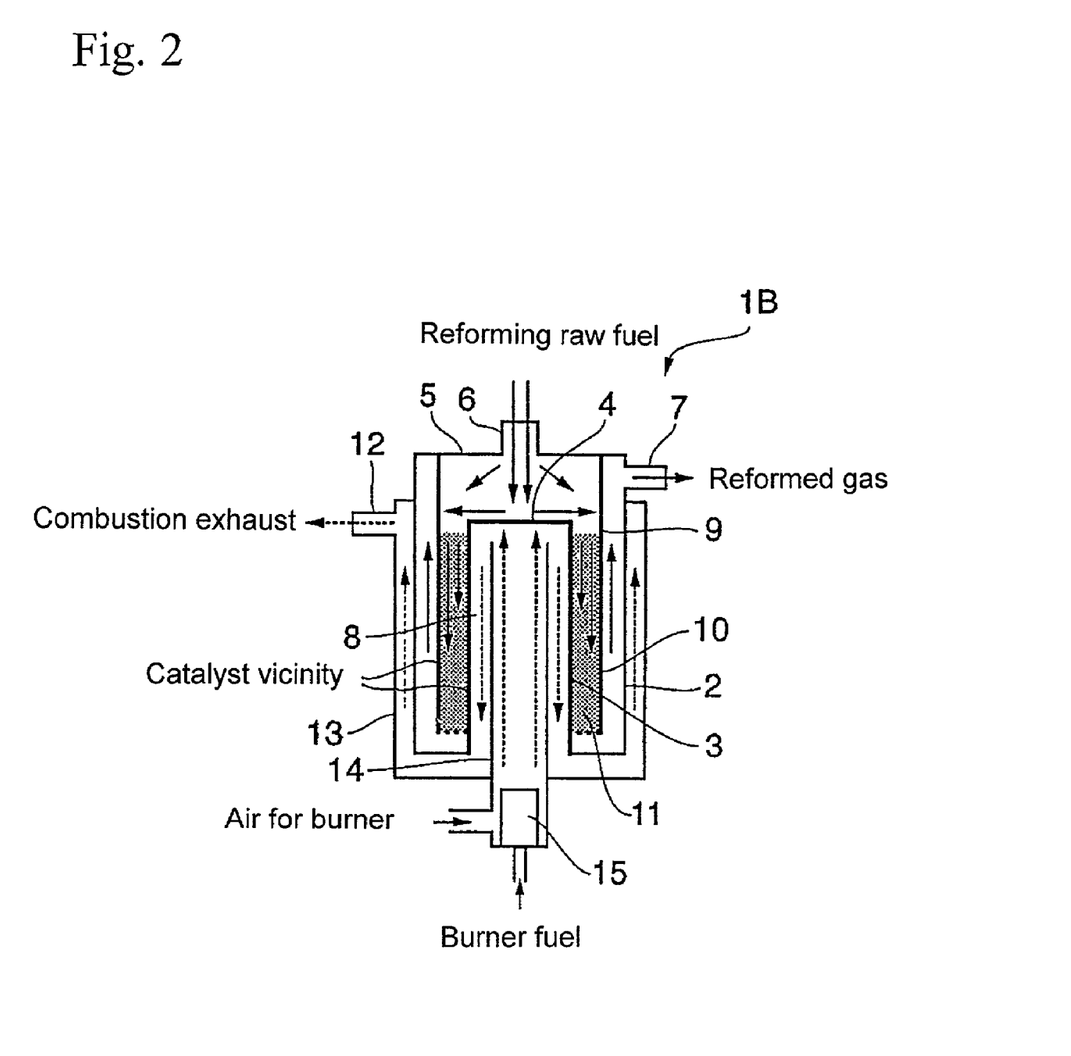
FIG. 2 is a cross-sectional illustrative drawing of another embodiment of the fuel reformer of the present invention.

FIG. 2 is a cross-sectional illustrative drawing of another embodiment of the fuel reformer of the present invention.

In FIG. 2, it is composed similarly to the fuel reformer 1A shown in FIG. 1 except that points indicated by a thin line such as combustion gas pipe 14, reforming tube outer cylinder 2, combustion exhaust pipe 13, reforming tube outer cylinder upper plate 5, or others composing the fuel reformer 1B are made of an ordinary steel, and points indicated by a bold line in FIG. 2 (catalyst tube 10, reforming tube inner cylinder 3, reforming tube inner cylinder upper plate 4, and others, mainly the portion where raw fuel introduced from a raw fuel inlet 6 and steam come into contact with at the upstream side) are made of the material according to the present invention.

Figure 3:
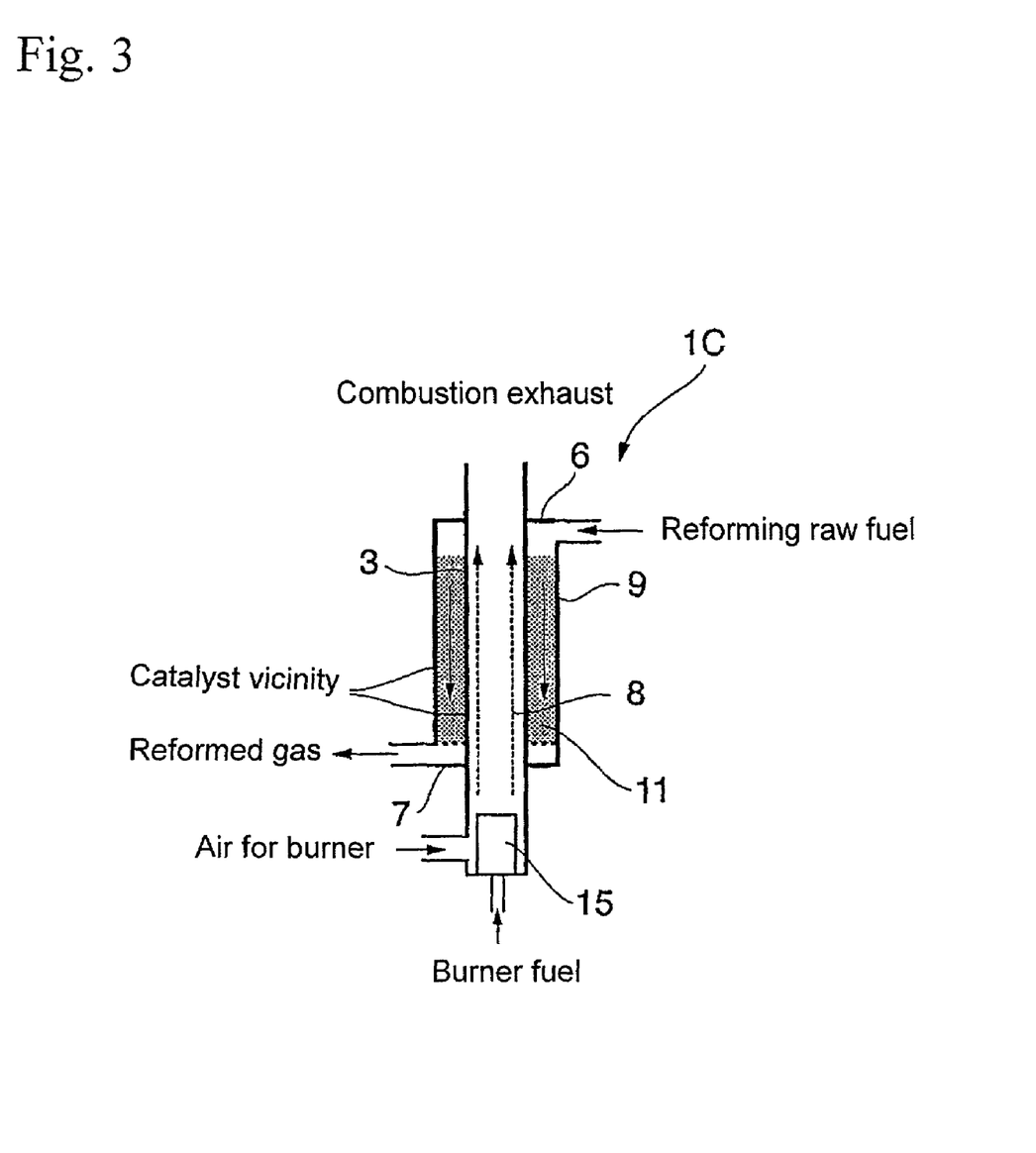
FIG. 3 is a cross-sectional illustrative drawing of another embodiment of the fuel reformer of the present invention.

FIG. 3 is a cross-sectional illustrative drawing of another embodiment of the fuel reformer of the present invention.

In FIG. 3, the fuel reformer 1C of the present invention comprising a reforming tube 9 including a raw material inlet 6 and a reformed gas outlet 7, a reforming tube inner cylinder 3 functioning also as combustion gas pipe, a burner 15 at the lower part of the reforming tube inner cylinder 3, and a reforming catalyst 11 filled in the inside of the reforming tube 9, is a fuel reformer of a type discharging combustion gas used for the heating from the upper part of the reforming tube inner cylinder 3.

In FIG. 3, gas fuel and air are introduced into the burner 15 to burn the gas fuel, the combustion gas is introduced into the combustion gas passage 8 for heating as shown by a broken line arrow, and thereafter, discharged from the upper part of the reforming tube inner cylinder 3. On the other hand, hydrocarbon base fuel, for instance, methane, is introduced into the fuel reformer 1C with water vapor from the raw fuel inlet 6 as shown by the arrow, and brought into contact with a heated reforming catalyst 11 to reform. The operating temperature of the reformer 1C is controlled to approximately 700° C. (outlet temperature of reforming catalyst layer 11) and operated. The generated reformed gas is discharged from the reformed gas outlet 7.

In FIG. 3, points indicated by a bold line (mainly a portion coming into contact with raw fuel introduced from the raw fuel inlet 6 and steam such as reforming tube inner cylinder 3, reforming tube 9 or others from the raw fuel inlet 6 of the fuel reformer 1C) composing the fuel reformer 1C are made of the material according to the present invention comprising Cr 15 to 25 mass %, Ni 8 to 35 mass %, Si 2 to 4 mass % and the remaining ingredients including Fe and inevitable impurities (C, Mn, P, S or others), or, are made of a material containing Cr 15 to 25 mass %, Ni 8 to 35 mass %, Si 2 to 4 mass %, Nb 0.05 to 1 mass % and the remaining ingredients including Fe and inevitable impurities (C, Mn, P, S or others), or, are made of a material containing Cr 17 to 20 mass %, Ni 8 to 14 mass %, Si 2 to 4 mass %, Nb 0.05 to 0.5 mass % and the remaining ingredients include Fe and inevitable impurities (C, Mn, P, S or others).

Figure 4:
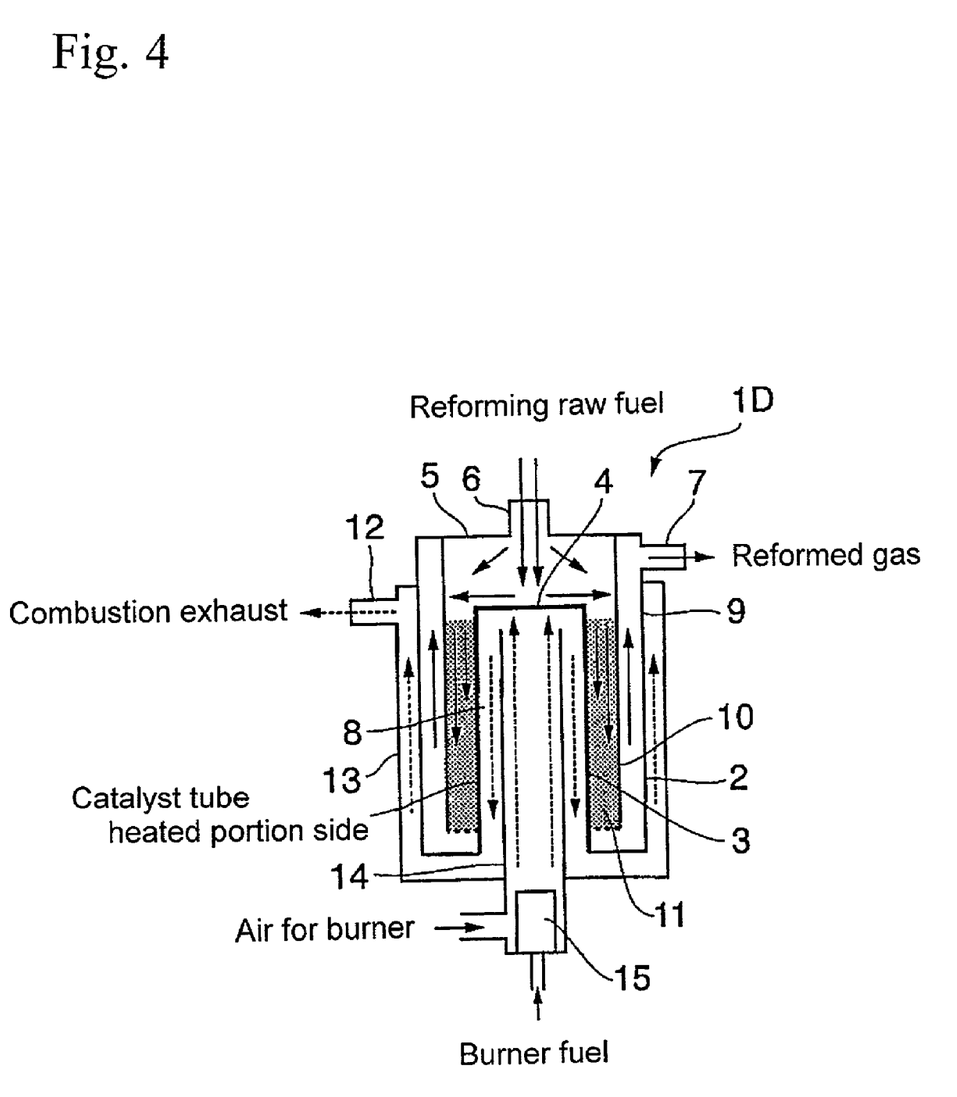
FIG. 4 is a cross-sectional illustrative drawing of another embodiment of the fuel reformer of the present invention.

FIG. 4 is a cross-sectional illustrative drawing of another embodiment of the fuel reformer of the present invention.

In FIG. 4, another fuel reformer 1D of the present invention is composed similarly to the fuel reformer 1A shown in FIG. 1 except that points indicated by a bold line (reforming tube inner cylinder 3, reforming tube inner cylinder upper plate 4, and others, mainly the portion where raw fuel introduced from the raw fuel inlet 6 and steam come into contact with and, at the same time, are heated by the combustion gas) are made of the material according to the present invention.

Figure 5:
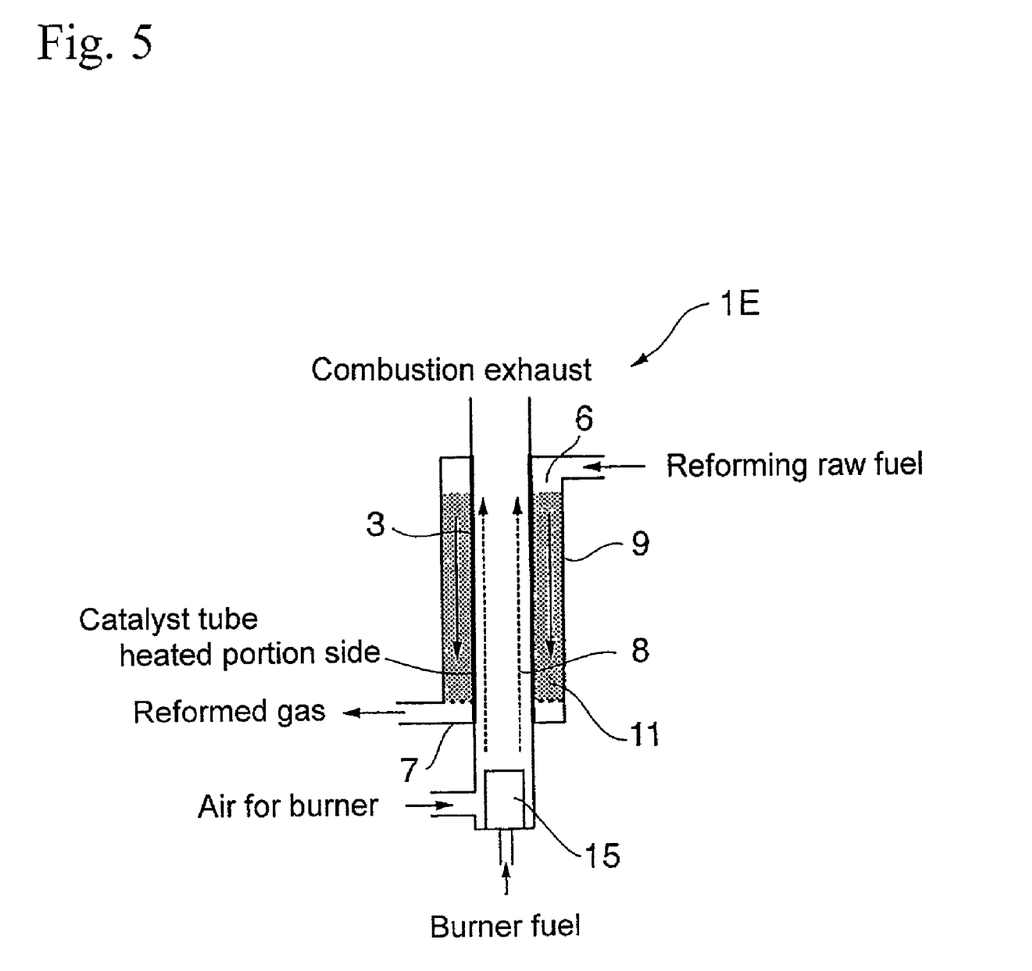
FIG. 5 is a cross-sectional illustrative drawing of another embodiment of the fuel reformer of the present invention.

FIG. 5 is a cross-sectional illustrative drawing of another embodiment of the fuel reformer of the present invention.

In FIG. 5, the fuel reformer 1E of the present invention is composed similarly to the fuel reformer 1C shown in FIG. 3 except that mainly reforming tube inner cylinder 3 indicated by a bold line (mainly the portion where raw fuel introduced from the raw fuel inlet 6 and steam come into contact with and, at the same time, are heated by the combustion gas) are made of the material according to the present invention.

The fuel reformer of the present invention can provide the sigma brittleness resistance and the cementation resistance by using the improved stainless material according to the present invention, without increasing the wall thickness of the reformer in order to make sigma brittleness resistance and cementation resistance compatible as in the related art, and is a light, highly workable, low cost and cheap, highly reliable and long life fuel reformer, The description of the aforementioned embodiments is only for the purpose of explanation of the present invention and does not limit the invention described in claims, nor reduce the scope. Also, the composition of respective parts of the present invention is not limited to the aforementioned embodiments, but various variants can be made without departing from the technical scope described in claims.

In short, the fuel reformer of the present invention is not limited to the fuel reformer of the type described in FIG. 1 to FIG. 5, but it may also be, for example, multi-tube type fuel reformer, flat plate type fuel reformer or the like, and as other examples, more particularly, fuel reformer described in FIG. 1 and FIG. 3 of Japanese Patent Publication No. 270381, fuel reformer described in FIG. 2 to FIG. 8 of Japan Patent Application Laid-Open Hei 6-13096, fuel reformer described in FIG. 1 to FIG. 3 of Japan Patent Application Laid-Open Hei 6-56401, fuel reformer described in FIG. 1, FIG. 4 and FIG. 7 of Japan Patent Application Laid-Open Hei 7-109105, fuel reformer described in FIG. 1 and FIG. 3 of Japan Patent Application Laid-Open Hei 7-223801, fuel reformer described in FIG. 1 and FIG. 22 of Japan Patent Application Laid-Open Hei 7-335238, fuel reformer described in FIG. 1 and FIG. 3 of Japan Patent Application Laid-Open Hei 9-241002, fuel reformer described in FIG. 1 of Japan Patent Application Laid-Open Hei 9-306553, fuel reformer described in FIG. 1 to FIG. 4 of Japan Patent Application Laid-Open Hei 10-125342 and others can be cited.

BEST MODE FOR CARRYING OUT THE INVENTION

Now the present invention shall be described more in detail by embodiments and comparative examples, but the present invention is not limed by these embodiments at all.

(Embodiment 1)

Using a fuel reformer 1A of the present invention wherein the material of the points indicated by a bold line in FIG. 1 (reforming tube outer cylinder 2, reforming gas outlet 7, catalyst tube 10, reforming tube inner cylinder 3, reforming tube inner cylinder upper plate 4, reforming tube outer cylinder upper plate 5, raw fuel inlet 6 and others composing the reforming tube 9) was prepared using the material A shown in Table 1, and the material Y shown in the Table 1 was used for weld zones, a prolonged continuous running was performed for reforming a raw fuel (methane) on the order of steam/carbon (mol ratio)=2.5 at an operation temperature about 700° C. (outlet temperature of the reforming catalyst 11). Thereafter, the operation was stopped, and the degree of corrosion was investigated for respective area 1 (reforming tube inner cylinder 3, reforming tube inner cylinder upper plate 4), area 2 (catalyst tube 10) and area 3 (reforming tube outer cylinder 2, reforming tube outer cylinder upper plate 5, raw fuel inlet 6, reforming gas outlet 7), and the results thereof are shown in Table 3. Used materials are shown in Table 2.

(Embodiment 2)

The degree of corrosion was investigated similarly to the Embodiment 1 except that the material B shown in Table 1 was used as material for the points indicated by a bold line in FIG. 1 (reforming tube outer cylinder 2, reforming gas outlet 7, catalyst tube 10, reforming tube inner cylinder 3, reforming tube inner cylinder upper plate 4, reforming tube outer cylinder upper plate 5, raw fuel inlet 6 and others composing the reforming tube 9), and the results thereof are shown in Table 3. Used materials are shown in Table 2.

(Embodiment 3)

The degree of corrosion was investigated similarly to the Embodiment 1 except that the material C shown in Table 1 was used as material for the points indicated by a bold line in FIG. 1 (reforming tube outer cylinder 2, reforming gas outlet 7, catalyst tube 10, reforming tube inner cylinder 3, reforming tube inner cylinder upper plate 4, reforming tube outer cylinder upper plate 5, raw fuel inlet 6 and others composing the reforming tube 9), and the results thereof are shown in Table 3. Used materials are shown in Table 2.

(Embodiment 4)

Using a fuel reformer 1B of the present invention wherein the material of the points indicated by a bold line in FIG. 2 (catalyst tube 10, reforming tube inner cylinder 3, reforming tube inner cylinder upper plate 4, and others) was prepared using the material A shown in Table 1, the material Y shown in the Table 1 was used for weld zones, and the other points (reforming tube outer cylinder 2, reforming tube outer cylinder upper plate 5, raw fuel inlet 6, reformed gas outlet 7) are made using a material Z shown in Table 1, a prolonged continuous running was performed for reforming a raw fuel (methane) on the order of steam/carbon (mol ratio)=2.5, operation temperature about 700° C. (outlet temperature of the reforming catalyst 11). Thereafter, the operation was stopped, and the degree of corrosion was investigated for respective area 1 (reforming tube inner cylinder 3, reforming tube inner cylinder upper plate 4), area 2 (catalyst tube 10) and area 3 (reforming tube outer cylinder 2, reforming tube outer cylinder upper plate 5, raw fuel inlet 6, reforming gas outlet 7), and the results thereof are shown in Table 3. Used materials are shown in Table 2.

(Embodiment 5)

The degree of corrosion was investigated similarly to the Embodiment 4 except that the material B shown in Table 1 was used as material for the points indicated by a bold line in FIG. 2 (catalyst tube 10, reforming tube inner cylinder 3, reforming tube inner cylinder upper plate 4 and others), and the results thereof are shown in Table 3. Used materials are shown in Table 2.

(Embodiment 6)

The degree of corrosion was investigated similarly to the Embodiment 4 except that the material C shown in Table 1 was used as material for the points indicated by a bold line in FIG. 2 (catalyst tube 10, reforming tube inner cylinder 3, reforming tube inner cylinder upper plate 4, and others), and the results thereof are shown in Table 3. Used materials are shown in Table 2.

(Embodiment 7)

Using a fuel reformer 1D of the present invention wherein the material of the points indicated by a bold line in FIG. 4 (reforming tube inner cylinder 3, reforming tube inner cylinder upper plate 4, and others) was prepared using the material A shown in Table 1, the material Y shown in the Table 1 was used for weld zones, and the other points (catalyst tube 10, reforming tube outer cylinder 2, reforming tube outer cylinder upper plate 5, raw fuel inlet 6, reformed gas outlet 7) are made using a material Z shown in Table 1, a prolonged continuous running was performed for reforming a raw fuel (methane) on the order of steam/carbon (mol ratio)=2.5, operation temperature about 700° C. (outlet temperature of the reforming catalyst 11). Thereafter, the operation was stopped, and the degree of corrosion was investigated for respective area 1 (reforming tube inner cylinder 3, reforming tube inner cylinder upper plate 4), area 2 (catalyst tube 10) and area 3 (reforming tube outer cylinder 2, reforming tube outer cylinder upper plate 5, raw fuel inlet 6, reforming gas outlet 7), and the results thereof are shown in Table 3. Used materials are shown in Table 2.

(Embodiment 8)

The degree of corrosion was investigated similarly to the Embodiment 7 except that the material B shown in Table 1 was used as material for the points indicated by a bold line in FIG. 4 (reforming tube inner cylinder 3, reforming tube inner cylinder upper plate 4 and others), and the results thereof are shown in Table 3. Used materials are shown in Table 2.

(Embodiment 9)

The degree of corrosion was investigated similarly to the Embodiment 7 except that the material C shown in Table 1 was used as material for the points indicated by a bold line in FIG. 4 (reforming tube inner cylinder 3, reforming tube inner cylinder upper plate 4, and others), and the results thereof are shown in Table 3. Used materials are shown in Table 2.

COMPARATIVE EXAMPLE 1

The degree of corrosion was investigated similarly to the Embodiment 1 except that the material X shown in Table 1 was used as material for the points indicated by a bold line in FIG. 1 (reforming tube outer cylinder 2, reforming gas outlet 7, catalyst tube 10, reforming tube inner cylinder 3, reforming tube inner cylinder upper plate 4, reforming tube outer cylinder upper plate 5, raw fuel inlet 6 and others composing the reforming tube 9), and the results thereof are shown in Table 3. Used materials are shown in Table 2.

COMPARATIVE EXAMPLE 2

The degree of corrosion was investigated similarly to the Embodiment 1 except that the material Y shown in Table 1 was used as material for the points indicated by a bold line in FIG. 1 (reforming tube outer cylinder 2, reforming gas outlet 7, catalyst tube 10, reforming tube inner cylinder 3, reforming tube inner cylinder upper plate 4, reforming tube outer cylinder upper plate 5, raw fuel inlet 6 and others composing the reforming tube 9), and the results thereof are shown in Table 3. Used materials are shown in Table 2.

COMPARATIVE EXAMPLE 3

The degree of corrosion was investigated similarly to the Embodiment 1 except that the material Z shown in Table 1 was used as material for the points indicated by a bold line in FIG. 1 (reforming tube outer cylinder 2, reforming gas outlet 7, catalyst tube 10, reforming tube inner cylinder 3, reforming tube inner cylinder upper plate 4, reforming tube outer cylinder upper plate 5, raw fuel inlet 6 and others composing the reforming tube 9), and the results thereof are shown in Table 3. Used materials are shown in Table 2.

TABLE 1

Chemical composition of used material (mass %)

| Material | Cr | Ni | Si | Mn | C | P | Others | Fe |
|---|---|---|---|---|---|---|---|---|
| A | 23.1 | 19.9 | 3.4 | 1.2 | 0.05 | 0.02 | | Remainder |
| B | 22.9 | 20.0 | 3.3 | 1.4 | 0.05 | 0.03 | Nb: 0.1 | Remainder |
| C | 19.0 | 13.1 | 3.3 | 0.8 | 0.04 | 0.03 | Nb: 0.1 | Remainder |
| X | 20.5 | 31.5 | 0.3 | 0.9 | 0.05 | 0.02 | Al: 0.4, Ti: 0.4, Cu: 0.4 | Remainder |
| Y | 24.9 | 19.5 | 0.9 | 1.5 | 0.05 | 0.02 | | Remainder |
| Z | 17.1 | 12.8 | 0.6 | 1.5 | 0.06 | 0.03 | No: 2.2 | Remainder |

TABLE 2

Used material

| | Area 1 | | Area 2 | Area 3 | | | | |
|---|---|---|---|---|---|---|---|---|
| | Reforming tube inner cylinder 3 | Reforming tube inner cylinder upper plate 4 | Catalyst tube 10 | Reforming tube outer cylinder 2 | Reforming tube outer cylinder upper plate 5 | Raw fuel inlet 6 | Reforming gas outlet 7 | Weld zones |
| Embodiment 1 | A | A | A | A | A | A | A | Y |
| Embodiment 2 | B | B | B | B | B | B | B | Y |
| Embodiment 3 | C | C | C | C | C | C | C | Y |
| Embodiment 4 | A | A | A | Z | Z | Z | Z | Y |
| Embodiment 5 | B | B | B | Z | Z | Z | Z | Y |
| Embodiment 6 | C | C | C | Z | Z | Z | Z | Y |
| Embodiment 7 | A | A | Z | Z | Z | Z | Z | Y |
| Embodiment 8 | B | B | Z | Z | Z | Z | Z | Y |
| Embodiment 9 | C | C | Z | Z | Z | Z | Z | Y |
| Comparative example 1 | X | X | X | X | X | X | X | Y |
| Comparative example 2 | Y | Y | Y | Y | Y | Y | Y | Y |
| Comparative example 3 | Z | Z | Z | Z | Z | Z | Z | Y |

TABLE 3

Corrosion damage situation

| | Area 1 | Area 2 | Area 3 |
|---|---|---|---|
| Embodiment 1 | Good | Good | Good |
| Embodiment 2 | Good | Good | Good |
| Embodiment 3 | Good | Good | Good |
| Embodiment 4 | Good | Good | Good |
| Embodiment 5 | Good | Good | Good |
| Embodiment 6 | Good | Good | Good |
| Embodiment 7 | Good | Good | Good |
| Embodiment 8 | Good | Good | Good |
| Embodiment 9 | Good | Good | Good |
| Comparative example 1 | Cementation | Cementation | Good |
| Comparative example 2 | Degradation, Cementation | Degradation | Good |
| Comparative example 3 | Damage: heavy | Damage: heavy | Good |

Table 3 teaches that the fuel reformer of embodiments 1 to 9 show an extremely little surface oxidation state for any of area 1 (reforming tube inner cylinder 3, reforming tube inner cylinder upper plate 4), area 2 (catalyst tube 10) and area 3 (reforming tube outer cylinder 2, reforming tube outer cylinder upper plate 5, raw fuel inlet 6, reforming gas outlet 7), no cementation or sigma brittleness are remarked, giving an excellent satisfaction.

In contrast, for the fuel reformer of the comparative example 1, cementation is confirmed in the area 1 (reforming tube inner cylinder 3, reforming tube inner cylinder upper plate 4) and area 2 (catalyst tube 10), and for the fuel reformer of the comparative example 2, a serious corrosion was provoked by oxidation in the area 1 (reforming tube inner cylinder 3, reforming tube inner cylinder upper plate 4) and area 2 (catalyst tube 10), the oxide film has pealed off, and partially cementation was confirmed and, at the same time, there were some points where σphase is observed in the reforming tube inner cylinder 3, confirming the generation of sigma brittleness. For the fuel reformer of the comparative example 3, a serious corrosion was provoked by oxidation and the oxide film has pealed off in the reforming tube inner cylinder 3 of the area 1 and the catalyst tube 10 of the area 2.

The fuel reformer of claim 1 of the present invention, using a material wherein a predetermined quantity of Si is added to ordinary stainless base material, heat resistant alloy and superalloy for at least a part of the material composing the reformer, has a remarkable effect of providing a further improved oxidation resistance, an improved cementation resistance, and also improved reliability and durable years of the reformer.

The fuel reformer of claim 2 of the present invention, using a material wherein a predetermined quantity of Si and Nb is added to ordinary stainless base material, heat resistant alloy and superalloy for at least a part of the material composing the reformer, has a remarkable effect of improving oxidation resistance, cementation resistance and intergranular corrosion resistance, and improving further reliability and durable years of the reformer.

The fuel reformer of claim 3 of the present invention, using a material wherein a predetermined quantity of Si and Nb is added to a SUS material of which contents of Cr, Ni are low and within the range of content of ordinary heat resistant alloy (SUS310S), makes the oxidation resistance equal or superior to SUS310S, but has a remarkable effect of improving cementation resistance and intergranular corrosion resistance, elevating further durable years and reliability, and at the same time allowing to provide a low cost and cheap reformer.

The fuel reformer of claim 4 of the present invention, wherein a portion where raw fuel introduced from a raw fuel inlet of the reformer and steam come into contact with is composed of the material according to the present invention, has a remarkable effect of allowing to improve effectively oxidation resistance, cementation resistance and intergranular corrosion resistance, and at the same time allowing to provide a low cost and cheap reformer.

The fuel reformer of claim 5 of the present invention, wherein a portion where raw fuel introduced from a raw fuel inlet of the reformer and steam come into contact with and which is a heated portion is composed of the material according to the present invention, has a remarkable effect of allowing to improve effectively oxidation resistance, cementation resistance and intergranular corrosion resistance, and at the same time, allowing to provide a low cost and cheap reformer.

INDUSTRIAL APPLICABILITY

The present invention concerns a fuel reformer for reforming a hydrocarbon base fuel into a hydrogen rich gas, the fuel reformer of claim 1, wherein at least a part of material composing the reformer is a material containing at least Cr, Ni, Si, made of Cr 15 to 25 mass %, Ni 8 to 35 mass %, Si 2 to 4 mass % and the remaining ingredients of Fe and inevitable impurities (C, Mn, P, S or others) provides the sigma brittleness resistance and the cementation resistance at the same time, and also a light weight, low cost and cheap price, high reliability, and long life, the fuel reformer of claim 2 of the present invention wherein at least a part of material composing the reformer is a material containing at least Cr, Ni, Si, Nb, and made of Cr 15 to 25 mass %, Ni 8 to 35 mass %, Si 2 to 4 mass %, Nb 0.05 to 1 mass % and the remaining ingredients include Fe and inevitable impurities (C, Mn, P, S or others), provides improved oxidation resistance, cementation resistance and intergranular corrosion resistance, and also further increased reliability, and durable years, therefore, the industrial applicability is considerably important.

The invention claimed is:

1. A fuel reformer for reforming a hydrocarbon rich gas, wherein at least a part of material composing the reformer is a material containing at least Cr, Ni, Si and Nb by Cr 17 to less than 20 mass %, Ni greater than 10 up to and including 14 mass %, Si a greater than 3 up to and including 4 mass %, Nb 0.05 to 0.5 mass %, and the remaining ingredients include Fe and inevitable impurities (C, Mn, P, S or others).

2. The fuel reformer according to claim 1, wherein a portion that is contacted by steam and raw fuel introduced from a raw fuel inlet of the reformer is composed of said material.

3. The fuel reformer according to claim 2, wherein a portion that is heated and is contacted by steam and raw fuel introduced from a raw fuel inlet of the reformer is composed of said material.

4. A fuel reformer for reforming a hydrocarbon rich gas, the reformer comprising at least one of a catalyst tube, a reforming tube inner cylinder, and a reforming tube inner cylinder upper plate, wherein at least one of the said at least one tube, cylinder and plate comprises a single layer of material containing at least Cr, Ni, Si and Nb by Cr 17 to less than 20 mass %, Ni greater than 10 up to and including 14 mass %, Si greater than 3 up to and including 4 mass %, Nb 0.05 to 0.5 mass %, and the remaining ingredients include Fe and inventable impurities (C, Mn, P, S or others).

* * * * *